United States Patent
Gibbs

(10) Patent No.: US 7,874,312 B1
(45) Date of Patent: Jan. 25, 2011

(54) WATER LEVEL CONTROLLER

(76) Inventor: Bradley O. Gibbs, 510 Kinley, NE., Albuquerque, NM (US) 87102

( * ) Notice: Subject to any disclaimer, the term of this patent is extended or adjusted under 35 U.S.C. 154(b) by 751 days.

(21) Appl. No.: 11/846,694

(22) Filed: Aug. 29, 2007

Related U.S. Application Data

(63) Continuation-in-part of application No. 11/091,284, filed on Mar. 28, 2005, now abandoned.

(51) Int. Cl.
*F16K 31/18* (2006.01)

(52) U.S. Cl. ..................................... 137/426; 137/434
(58) Field of Classification Search ................. 137/426, 137/434; 5/408
See application file for complete search history.

(56) References Cited

U.S. PATENT DOCUMENTS

| | | | | |
|---|---|---|---|---|
| 2,847,026 A | * | 8/1958 | Nelson | 137/434 |
| 5,682,919 A | * | 11/1997 | DiMaggio | 137/312 |
| 5,836,022 A | * | 11/1998 | Busenga | 4/508 |
| 6,336,469 B1 | * | 1/2002 | Nixon et al. | 137/312 |
| 6,363,962 B1 | * | 4/2002 | Geisinger | 137/312 |
| 6,895,990 B1 | * | 5/2005 | Carroll | 137/312 |

* cited by examiner

*Primary Examiner*—John Rivell
*Assistant Examiner*—Craig Price
(74) *Attorney, Agent, or Firm*—Ray R. Regan

(57) ABSTRACT

The specification and drawing figures describe and show an adjustable water level controller that includes a stanchion. The stanchion is mounted to a base. A sleeve is included that is movably adjustable on the stanchion. A water delivery device is attached to the sleeve. The base and stanchion are rotationally positioned in relationship to the sleeve to achieve the proper water level in a container in which the adjustable water level controller is positioned.

11 Claims, 6 Drawing Sheets

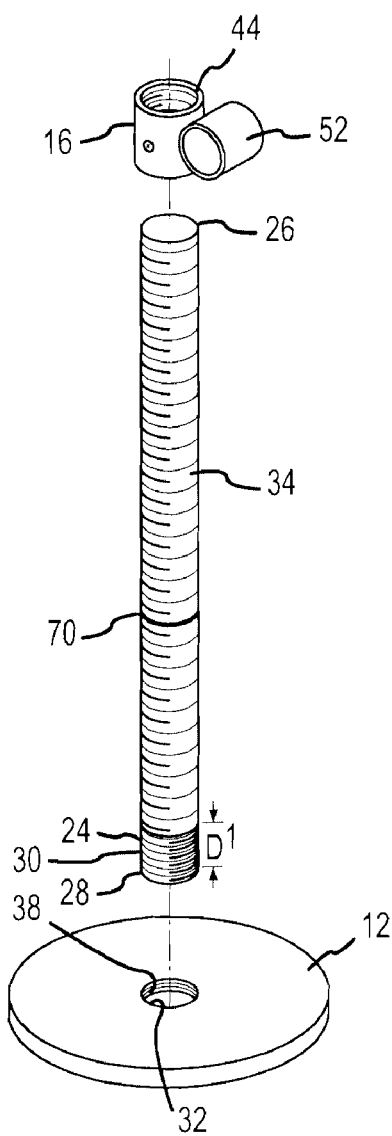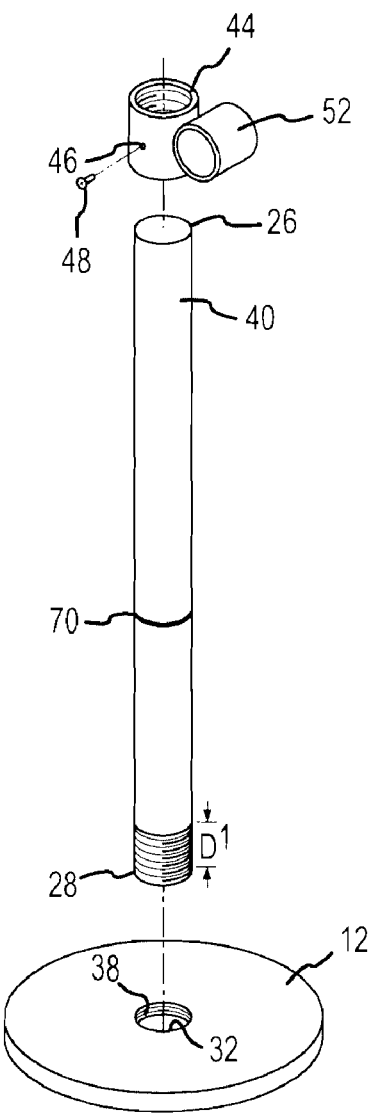
FIG.5A
FIG.5B

WATER LEVEL CONTROLLER

CROSS-REFERENCE TO RELATED APPLICATION

This application is a continuation-in-part from a application Ser. No. 11/091,284, entitled ADJUSTABLE WATER LEVEL CONTROLLER filed on Mar. 28, 2005 now abandoned ("Parent Application"). The specification of the pending application is incorporated by reference into this document.

FIELD OF TECHNOLOGY

The apparatus and method disclosed, illustrated and claimed in this document pertain generally to controlling a desired depth and level of water within a container. More particularly, the new and useful water level controller disclosed and claimed in this document is capable of maintaining water within a container associated with an evaporative air conditioner at a desired or predetermined height or depth within the container.

BACKGROUND

In hot, dry climates such as the high altitude desert southwest region of the United States many buildings, including homes and offices, often are cooled by an air conditioning system that uses forced air and water to lower the ambient temperature in the building by approximately fifteen to twenty degrees Fahrenheit. This technique of evaporative cooling to achieve lower temperatures is achieved by a mechanical unit often referred to as an evaporative air conditioner, evaporative cooler, or "swamp cooler" (collectively in this document, "evaporative air conditioner").

A type of conventional evaporative air conditioner is illustrated in FIG. 6, also marked "Prior Art." As shown in FIG. 6, an evaporative air conditioner operates by forcing outside air through water soaked pads into a building. Cooled air is directed into the building by a motor, usually electric, that rotates a fan that in turn distributes the cooled air throughout the building through a duct system. During operation, water soaked pads installed in the evaporative air conditioner are continuously moistened by a water pump. The water pump generally is placed in or adjacent to a reservoir or container at the bottom of the evaporative air conditioner (collectively, "container"). Through one or more flexible tubes connected to the pump, which in turn is connected to a source of water that usually is exterior to the evaporative air conditioner, the pump delivers water to the top of the pads located in the evaporative air conditioner. Gravity draws the water downward through the pads and back into the container.

A conventional evaporative air conditioner is designed to re-circulate most of the water used during the air conditioning process. A percentage of water, however, is lost to evaporation, leakage, and overflow. Lost water must be replaced to maintain constant dampness in the pads. Thus, the container in an evaporative air conditioner must maintain a substantially constant water level to supply the pump with appropriate water to circulate through the system, and to apply the necessary amount of water to the pads.

The principles of operation associated with the evaporative air conditioner are illustrated in FIG. 6, and provide a comparatively low-cost, low-technology alternative to what is known as refrigerated air conditioning. Fresh outside air is pulled through moist pads where it is cooled by evaporation and circulated through a building. As illustrated in FIG. 6, an evaporative air conditioner includes a fan within a blower unit. Moist pads are located in front of the blower. The fan draws warm outside air through the pads and blows the cooled air through the building. Comparatively small distribution lines supply water to the top of the pads. Water soaks the pads as it trickles through the pads by gravity to a monolithic container at the bottom of the evaporative air conditioner. A recirculating water pump directs collected water in the container back to the top of the pads.

However, because water is continuously lost to evaporation, a conventional float valve adds water to the container as the water level in the container declines. An evaporative air conditioner may use between 3 and 15 gallons of water per day. The conventional float valve, as explained in this document, has many limitations because the float valve system is essentially fixed in a wall of the evaporative air conditioner as illustrated in FIG. 6. The water level controller disclosed, illustrated and claimed in this document overcomes the limitations of the conventional float valve that is rigidly attached to and/or through a wall of an evaporative air conditioner.

Generally, as indicated, water level in the container of an evaporative air conditioner is maintained by a conventional float assembly. In general, a conventional float assembly includes a valve or other water delivery device that allows fresh water to be added to the amount of water being re-circulated through the evaporative air conditioner. As water rises or falls within the container, a float opens or closes the water delivery system, adjusting the water flow into the evaporative air conditioner.

The conventional water delivery device and the float are both difficult to replace and maintain during operation because they are usually attached to the metal frame or wall of an evaporative air conditioner, as illustrated in FIG. 6. In addition, corrosion and calcium from the water build up on both the float and the water delivery device, making it difficult to remove or replace the water delivery device and the float during routine maintenance. Indeed, constant adjustment is required to maintain a proper water level in the container, and to thereby maintain a proper amount of water delivered to the pads. Too much water, for example, may result in spillage of water from the container. Too little water, however, causes the cooling affect of the evaporative air conditioner to cease, and can lead to a total malfunction of the pump. Also a lever arm connects the conventional float to the water delivery system. Bending the arm that connects the valve to the water delivery system is generally the only means for adjusting the float in an effort to maintain the proper amount and level of water requisite for normal functioning of an evaporative air conditioner. Accordingly, accurate adjustment is difficult. Accurate adjustment of the float requires a user of an evaporative air conditioner to constantly monitor the level of water in the container. This is made even more difficult in areas where the evaporative air conditioners are located on roofs of buildings. Failure to frequently adjust the lever aim causes overflow from the container of an evaporative air conditioner often creates ugly stains on roofs because of calcium and other chemicals and minerals in the water, and may cause leakage into the building through the roof, particularly where "pueblo style" flat roofed homes and buildings are popular.

A need exists in the industry, therefore, for a new and useful adjustable water level controller that is easy to install in an evaporative air conditioner, easy to maintain and repair, and which maintains the proper water level within the container of an evaporative air conditioner. In addition, the need exists in the industry for a water level controller that allows a user to avoid the need to check water levels during operation, and avoids spillage and leakage from the container. In addition, a need exists for a water level controller that can be stored during seasons in which the evaporative air conditioner is not running, may be used with any sized or dimensioned evaporative air conditioner, and eliminates the need to bend or otherwise distort components associated with an evaporative air conditioner in order to achieve and maintain a proper amount and level of water within an evaporative air conditioner system.

SUMMARY

The adjustable and removable water level controller includes a support stand. The support stand includes a base that is positionable in the container of an evaporative air conditioner. A stanchion is mounted on the base. A sleeve is provided that is variably positionable on the stanchion. Both the stanchion and the sleeve may be threaded for threadable engagement of the sleeve on the stanchion. Alternatively, a positionable sleeve may be provided for positioning the sleeve on a non-threaded stanchion. A float assembly also is included. The float assembly includes a water delivery device that is attached to the sleeve. The water delivery device is connectable to a flexible hose through which water may flow through the water level controller from a water source. In addition, the float assembly includes a lever arm to which is attached a float.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the adjustable water level controller will become apparent to those skilled in the art when read in conjunction with the following description, drawing figures, and appended claims.

The foregoing has outlined broadly the more important features of the invention to better understand the detailed description that follows, and to better understand the contributions to the art. The adjustable water level controller is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the adjustable water level controller, which is measured by the claims, nor intended to limit the scope of the claims. The novel features of the adjustable water level controller are best understood from the accompanying drawing, considered in connection with the accompanying description of the drawing, in which similar reference characters refer to similar parts, and in which:

BRIEF DESCRIPTION OF THE DRAWING

FIG. 5A shows another embodiment of the stanchion of the adjustable water level controller and one embodiment of the sleeve of the adjustable water level controller;

FIG. 5B shows an embodiment of the stanchion of the adjustable water level controller and another embodiment of the sleeve of the adjustable water level controller.

Figure 1:
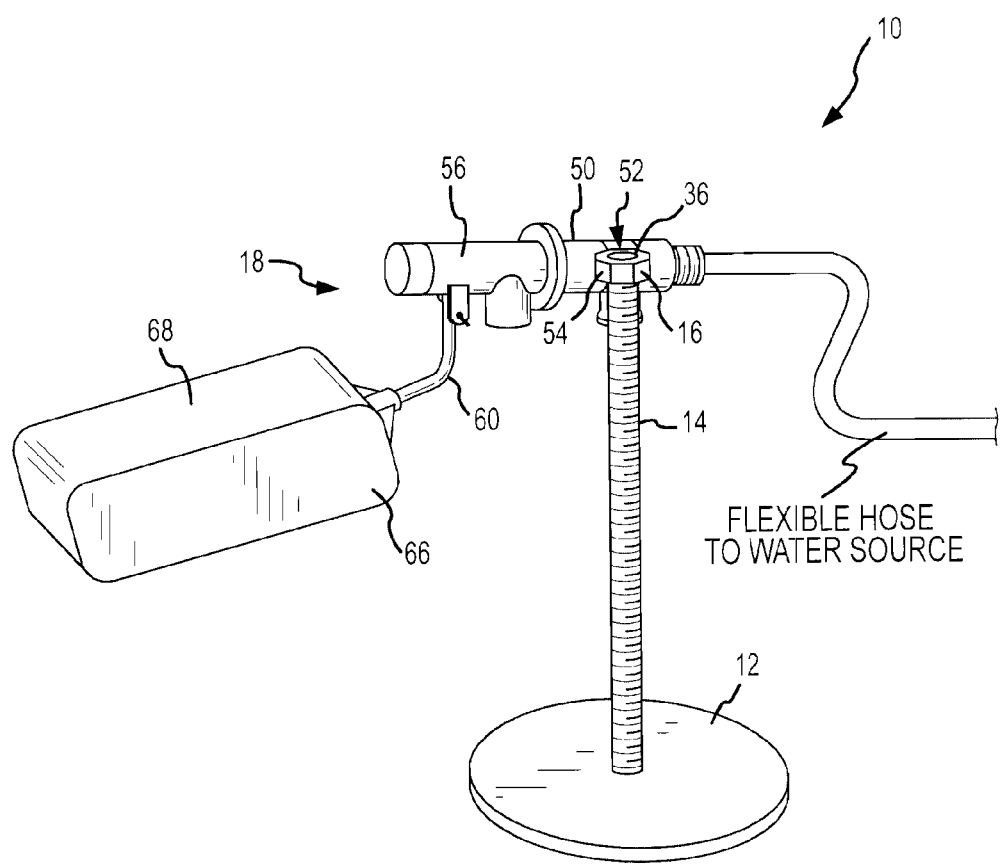
FIG. 1 of the drawing is a perspective view of the adjustable water level controller.

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

DETAILED DESCRIPTION

Definitions

As used in this document, the term "float assembly" means the combination of a water delivery device, a lever arm connectable to the water delivery device, and a buoyant float attachable to the lever arm.

The term "adjustable" as used in this document in conjunction with the water level controller means that a float assembly included with the water level controller may be repositioned along a stanchion also included with the water level controller to achieve and maintain a desired depth of water within the container of an evaporative air conditioner.

The term "removable" as used in this document in conjunction with the water level controller means that the entire apparatus of the water level controller is not affixed to any member or component of an evaporative air conditioner. Rather, because the water level controller is made of materials that are not buoyant in water, the water level controller may be placed by hand in the water of a container of an evaporative air conditioner, and removed by hand from the water of a container of an evaporative air conditioner, thus making the water level controller positionable and repositionable within the container of an evaporative air conditioner, relocatable within the container, and removable, all without application or use of any tools to insert the water level controller into the container, remove the water level controller from the container, or to place the water level controller anywhere within the container,

Description

As shown in FIGS. 1 through 5B, an adjustable water level controller 10 is provided. In its broadest context, adjustable water level controller 10 includes a base 12, a stanchion 14, a sleeve 16, and a float assembly 18.

Figure 2:
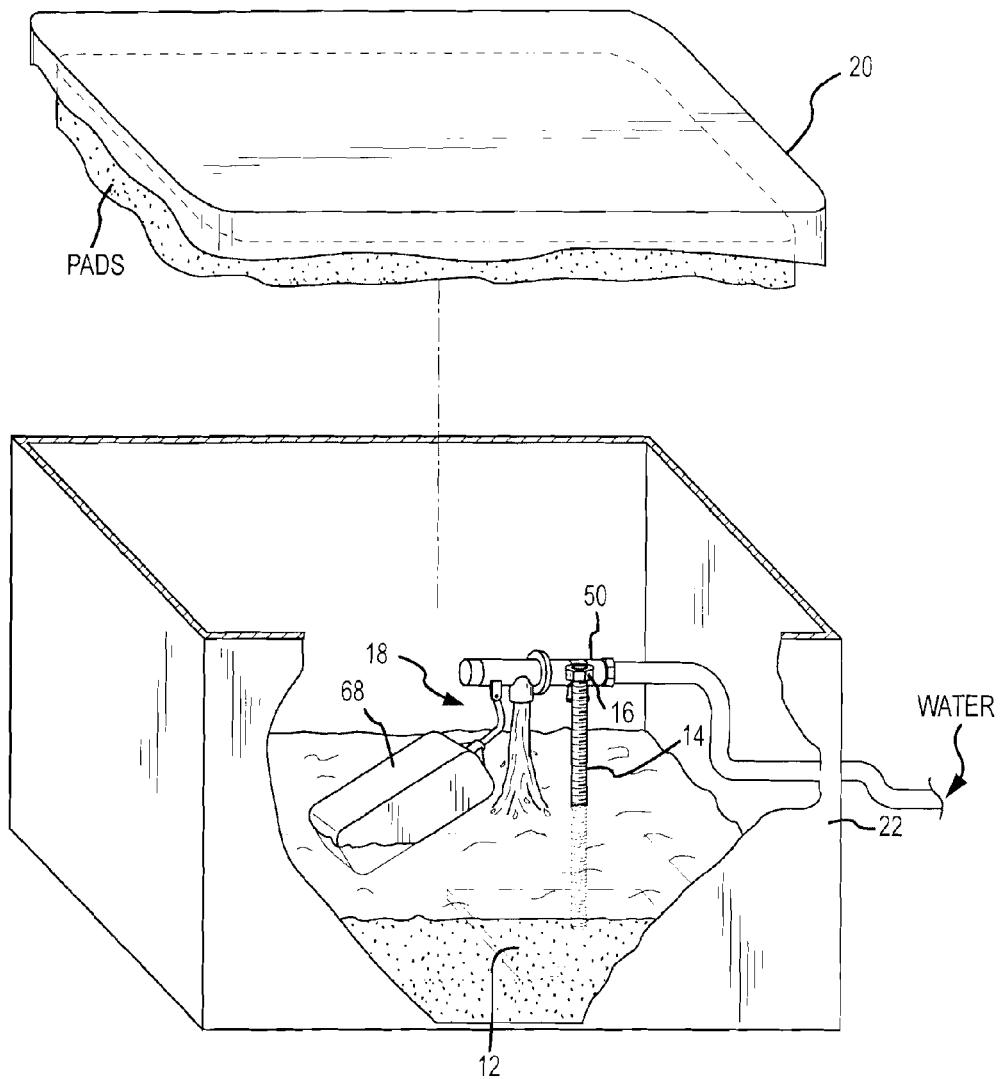
FIG. 2 shows the adjustable water level controller in an operative environment of an evaporative air conditions.

More specifically, in the embodiment shown in FIGS. 1-2, adjustable water level controller 10 includes base 12. Base 10 is removably positionable in evaporative air conditioner 20. As shown in FIG. 2, evaporative air conditioner 20 includes a reservoir or container (collectively, "container") 22. As shown, base 12 is not designed to be fixed or attached to evaporative air conditioner 20. Rather, base 12 is manufactured of a material that is resistant to flotation in water, and is sufficiently heavy to rest in any amount of water held by container 22 of evaporative air conditioner 20. As shown in FIG. 1, base 12 is circular, and as shown in FIG. 2, base 12 is another shape or configuration. As will be evident to one skilled in the art, the shape of base 12 is not a limitation of adjustable water level controller 10.

In the embodiment shown by cross-reference between FIGS. 1 and 5A-5B, base 12 includes means 24 for mounting stanchion 14 to base 12. As shown in FIGS. 5A-5B, stanchion 14 is formed with a proximal end 26 and a distal end 28. As also shown, distal end 28 of stanchion 14 is formed with attaching threads 24. In addition, base 12 is formed with a chamber 32. Chamber 32 is further formed with mateable interior threads 38. As will be apparent to one skilled in the art, attaching threads 24 on stanchion 14 are removably engageable with interior threads 38 in chamber 32 of base 12 for connecting base 12 and stanchion 14.

Figure 3:
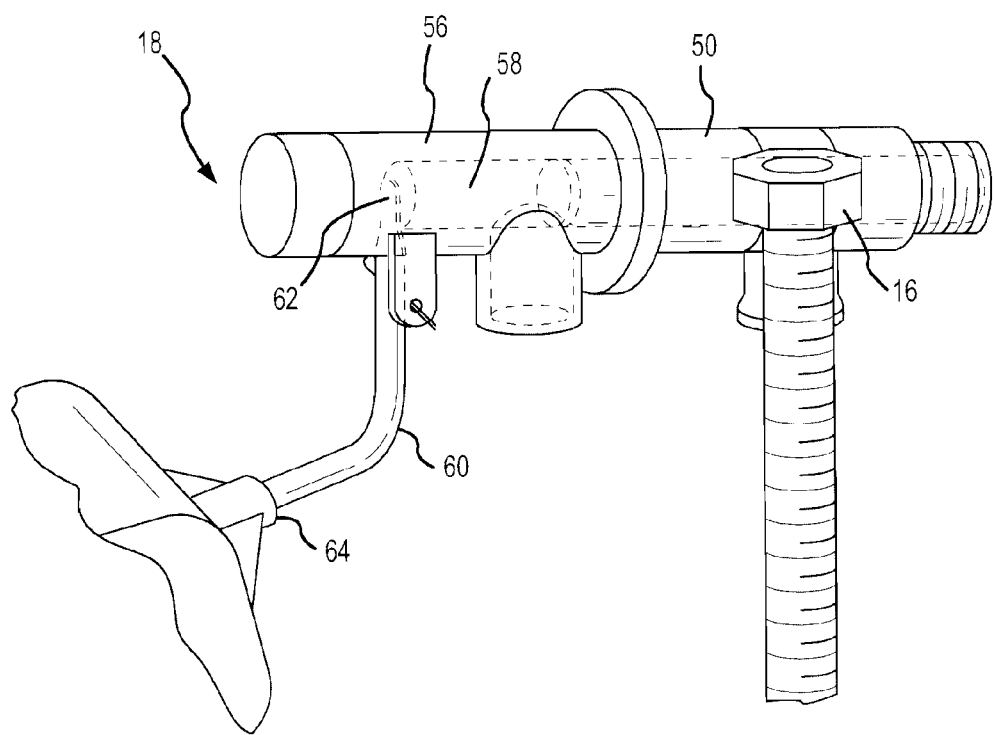
FIG. 3 shows the water delivery system.
Figure 4A:
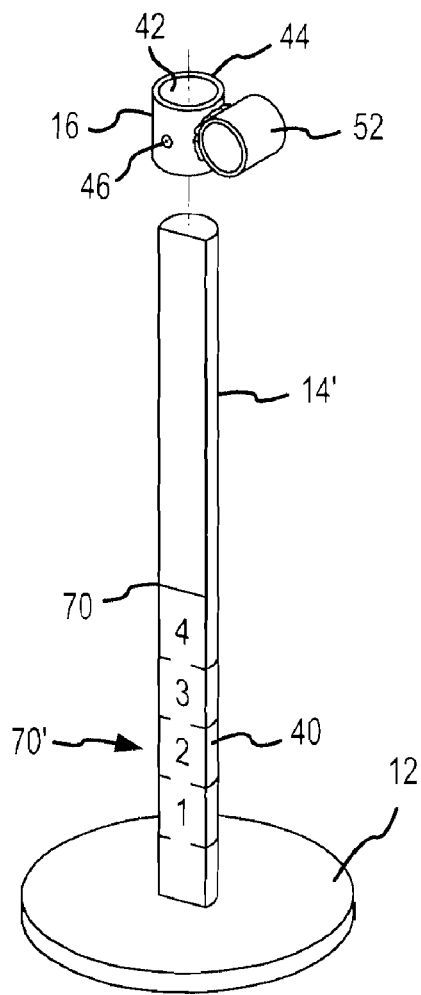
FIG. 4A shows an embodiment of the stanchion of the adjustable water level controller and one embodiment of the sleeve of the adjustable water level controller.
Figure 4B:
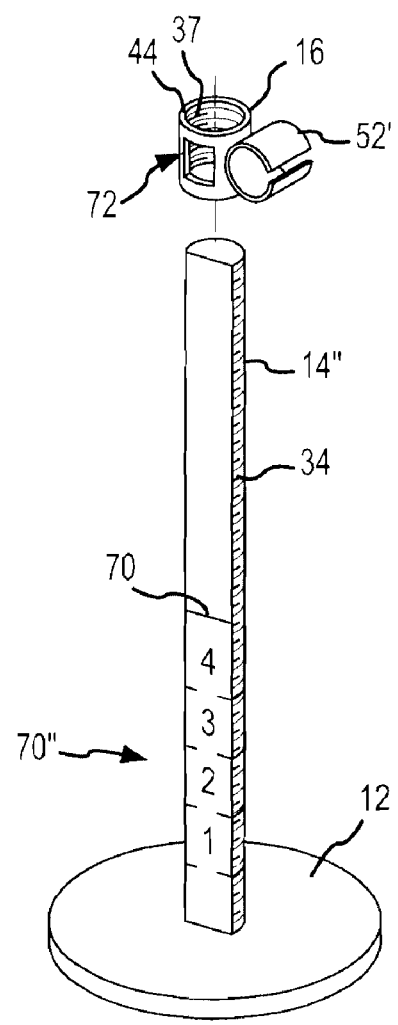
FIG. 4B show another embodiment of the stanchion and another embodiment of the sleeve of the adjustable water level controller.
Figure 6:
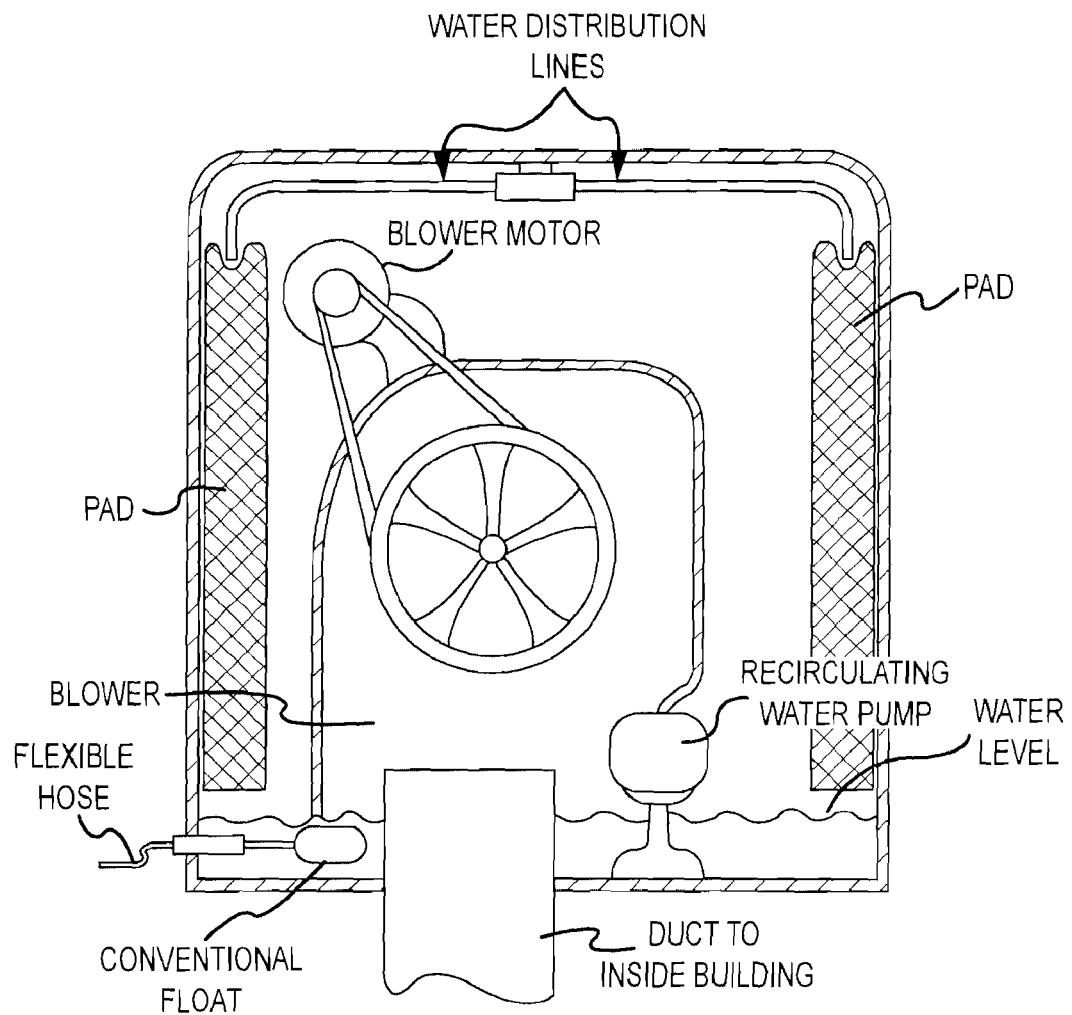
FIG. 6 shows one example of the major components of an evaporative air conditioner, and is marked "Prior Art."

In the embodiments shown in FIGS. 4B and 5B, stanchion 14 is formed with exterior threads 34 between distal end 28 and proximal end 26 of stanchion 14. As also shown, sleeve 16 is formed with a bore 36. Bore 36 is provided for variably positioning sleeve 16 on stanchion 14. In the embodiment shown in FIGS. 3A and 4A, bore 36 is formed with interior threads 37. Exterior threads 34 on stanchion 14 are formed for mateable threadability with interior threads _37 of bore 36. As will be apparent to one skilled in the art, exterior threads 34 of stanchion 14 and interior threads 37 permit a user to locate sleeve 16 at a predetermined or desired height on stanchion 14.

In the embodiments shown in FIGS. 4A and 5B, stanchion 14 does not include exterior threads 34. As shown, stanchion 14 is formed with a substantially smooth exterior surface 40. Likewise, bore 36 may be formed with an interior surface 42 (not shown) that is substantially smooth. Sleeve 16 includes a wall 44. Wall 44 is formed with an opening 46 as best shown in FIG. 5B. A setscrew 48 is rotationally insertable and removable through opening 46 in wall 44 of sleeve 16. Setscrew 48 is designed for engagement of setscrew 48 against exterior surface 40 of stanchion 14 and, when tightened, holds sleeve 16 in the desired position on stanchion 14.

Accordingly, it will be evident to one skilled in the art that neither a threaded stanchion nor a threaded sleeve is limitations of adjustable water level controller 10. Sleeve 16 may be selected from a group of sleeves consisting of depth stops, nuts positionable by finger tightening, self-adjusting and self-tightening nuts, clamps, and stoppers. One example of a depth stop that may be used as sleeve 16 as shown in FIG. 5B is manufactured by The MIBRO Group, Buffalo, N.Y. 14225 under the registered trademark MIBRO INDUSTRIAL®.

In the embodiment shown in FIGS. 1-3, adjustable water level controller 10 includes a float assembly 18. As shown, float assembly 18 includes a water delivery device 50. Water delivery device 50 is attachable to sleeve 16. As will be evident to one skilled in the art, water delivery device 50 may be attached to sleeve 16 by any number of means 52 for attaching water delivery device 50 to sleeve 16. Thus, as shown in FIGS. 1-3, means 52 is a nut 54. However, means 52 for attaching water delivery device 50 to sleeve 16 may include means 52 selected from the group of attaching means 52 consisting of clamps, brackets, soldered joints, carriages, cases, drums, rings and jackets.

Float assembly 18 also includes, as perhaps best shown in FIGS. 1 and 3, a hollow tube 56 formed in water delivery device 50. Water delivery device 50 also includes at least one plug 58. Plug 58 is slidably movable within hollow tube 56 for regulating fluid communication through water delivery device 50. More specifically, at least one plug 58 is reciprocably moveable within hollow tube 56. Water delivery device 50 also includes a lever arm 60. Lever arm 60 is formed with a lever extension 62. Lever extension 62 is locatable in water delivery device 50 for reciprocating movement of the at least one plug 58 along the longitudinal axis through the center of hollow tube 56. The opposing end 64 of lever arm 60 holds a substantially hollow housing 66. Substantially hollow housing 66 may be a float 68. Float 68 is removably attachable to opposing end 64 of lever arm 60.

In operation, adjustable water level controller 10 as shown in FIG. 2, is located in container 22 of evaporative air conditioner 20. As installed, water delivery device 50 is attached to sleeve 16 of adjustable water level controller 10. Further, stanchion 14 has been inserted into base 12 of adjustable water lever controller 10. The level in water in container 22 of evaporative air conditioner 20 is either prescribed by the manufacturer of evaporative air conditioner 20, or predetermined by the user of adjustable water level controller 10. The user is able to set the height of float assembly 18 in relationship to the water level in container 22 at a predetermined height. The proper positioning of float assembly 18 on stanchion 14 that is attached to base 12 is achieved by rotating base 12 within sleeve 16 to adjust the level of sleeve 16 on stanchion 14. When the proper positioning of sleeve 16 on stanchion 14 is achieved, base 12 may be inserted in container 22. Float assembly 18 may be activated by connecting water delivery device 50 of float assembly 18 to a source of water. As shown in FIGS. 4A-5B, a level indicator line 70 may be scribed by a user at the level of water desired in connection with the particular container 22 of evaporative air conditioner 20. As also shown by cross-reference between FIGS. 4A and 4B, additional water level indicators 70', shown as numbers arranged on stanchions 14' and 14", may be placed on stanchions 14' and 14". The numbers arranged on stanchions 14' and 14" may refer to inches, centimeters, or arbitrary water levels. In addition, sleeve 16 may be formed with a level view window 72 as shown in FIG. 4B. As will be evident to one skilled in the art, level view window 72 provides an alternative method for adjusting sleeve 16 on stanchion 14" to a desired height on stanchion 14" viewed through level view window 72.

As will be evident to one skilled in the art, operation and installation of adjustable water level controller 10 does not require forming orifices or holes in container to permit water flow from container. In operation of adjustable water level controller 10 it also is unnecessary to use nuts and screws on the lever or lever extension to preset the buoyant valve. Further, it is not necessary to bend lever arm or provide special adjustment devices such as springs to adjust the buoyant float in relationship to water in the container.

The adjustable water level controller shown in drawing FIGS. 1 through 5B is shown in at least one embodiment, but the embodiments are not intended to be exclusive, merely illustrative of the disclosed but non-exclusive embodiments. Claim elements and steps in this document have been numbered and/or lettered solely as an aid in readability and understanding. Claim elements and steps have been numbered solely as an aid in readability and understanding. The numbering is not intended to, and should not be considered as intending to, indicate the ordering of elements and steps in the claims. Means-plus-function clauses in the claims are intended to cover the structures described as performing the recited function that include not only structural equivalents, but also equivalent structures. Thus, although a nail and screw may not be structural equivalents, in the environment of the subject matter of this document a nail and a screw may be equivalent structures.

Method steps may be interchanged sequentially without departing from the scope of the claims.

Means-plus-function clauses in the claims are intended to cover the structures described as performing the recited function that include not only structural equivalents, but also equivalent structures.

What is claimed is:

1. A prepositionable evaporative air conditioner water level controller, comprising:
   a nonbuoyant monolithic base,
      wherein the nonbuoyant monolithic base is adapted to be removably positionable without a tool in a water container of the evaporative air conditioner;
   a stanchion having a first end adapted to be detachably mountable on the base;
   a sleeve threadably reciprocated along a longitudinal axis of the stanchion for adjustment of the water level;
   a water delivery device attachable to the sleeve
      wherein the water delivery device includes at least one plug slidably movable within a hollow tube for regulating fluid communication through the water delivery device;
   a lever arm formed with a lever extension, wherein the lever extension is locatable in the water delivery device for reciprocating movement of the at least one plug along the longitudinal axis through the center of the hollow tube; and
   a float assembly detachably connectable to the water delivery device,
      wherein the float assembly includes a substantially hollow housing attachable to the lever arm.

2. A prepositionable evaporative air conditioner water level controller as recited in claim 1, further comprising means formed in the first end of the stanchion for detachably mounting the stanchion on the base.

3. A prepositionable evaporative air conditioner water level controller as recited in claim 2, wherein the detachably mounting means includes mounting threads formed adjacent the first end of the stanchion.

4. A prepositionable evaporative air conditioner water level controller as recited in claim 3, wherein the detachably mounting means includes a chamber in the nonbuoyant monolithic base formed with threads for threadable engagement with the mounting threads.

5. A prepositionable evaporative air conditioner water level controller as recited in claim 4, further comprising means for attaching the float assembly to the sleeve.

6. A prepositionable evaporative air conditioner water level controller as recited in claim 5, wherein the water delivery device is attachable to the sleeve by clamps, soldered joints, or rings.

7. An apparatus for controlling water level in an evaporative air conditioner, comprising:
   a one-piece support stand positionable by hand in the evaporative air conditioner,
      wherein the one-piece support stand includes a stanchion extending at substantially a right angle from the monolithic support stand, and further wherein the one-piece support stand is not affixed to the evaporative air conditioner;
   a water delivery device connectable to one end of the stanchion adapted for fluid communication with a water source,
      wherein the water delivery device includes a sleeve that is threadably reciprocated along a longitudinal axis of the stanchion for adjustment of the water level and is from the group of sleeves consisting of depth stops, nuts positionable by finger tightening, self-tightening nuts, clamps, and stoppers;
   means for positioning the water delivery device on the stanchion;
   a float assembly detachably connectable to the water delivery device; and
   means for viewing one or more water levels on the apparatus.

8. An apparatus for controlling water level in an evaporative air conditioner as recited in claim 7, wherein the monolithic support stand is formed from a material that does not float in water.

9. A method for controlling water level in a container of an evaporative air conditioner, comprising:
   providing a nonbuoyant monolithic base;
   equipping the nonbuoyant monolithic base with a stanchion extending substantially vertically from the nonbuoyant monolithic base;
   forming a sleeve engagable with the stanchion for positioning the sleeve on the support stand; wherein the sleeve is threadably reciprocated along a longitudinal axis of the stanchion for adjustment of the water level;
   attaching a water delivery device to the sleeve;
   attaching a float assembly to the water delivery device;
   manipulating the support stand and sleeve by hand to position the float assembly at a desirable free-standing position in the container by fixing the sleeve at a desired location on the stanchion; and
   activating water flow through the water delivery device to the float assembly.

10. A method for controlling water level in the container of the evaporative air conditioner as recited in claim 9, wherein the float assembly attaching step includes the substeps of:
   selecting the float that is buoyant in water;
   shaping material to form a lever having a distal end and a proximal end;
   shaping the proximal end of the lever to form a lever extension;
   attaching the distal end of the lever to the float;
   selecting the water delivery device having at least one plug;
   attaching the water delivery device to the sleeve;
   inserting the lever extension into the water delivery system; and
   positioning the lever extension for intermittent contact with one end of the plug.

11. A method for controlling water level in the container of the evaporative air conditioner as recited in claim 10, wherein the support stand and the sleeve manipulating step includes the substep of rotating the support stand clockwise or counterclockwise in the sleeve to adjust the float in relationship to the water level desired in the container.

* * * * *